United States Patent
Davter et al.

(10) Patent No.: US 10,538,140 B2
(45) Date of Patent: Jan. 21, 2020

(54) CABIN PRESSURIZATION SYSTEM FOR AGRICULTURAL MACHINES, HAVING A FILTRATION SYSTEM

(71) Applicant: DENSO THERMAL SYSTEMS S.p.A., Poirino, (Turin) (IT)

(72) Inventors: Massimo Davter, Poirino (IT); Piero Scarrone, Poirino (IT); Silvano Bertaglia, Poirino (IT)

(73) Assignee: DENSO THERMAL SYSTEMS S.P.A., Porino, Turin (IT)

( * ) Notice: Subject to any disclaimer, the term of this patent is extended or adjusted under 35 U.S.C. 154(b) by 24 days.

(21) Appl. No.: 15/304,840

(22) PCT Filed: Apr. 16, 2015

(86) PCT No.: PCT/IB2015/052770
§ 371 (c)(1),
(2) Date: Oct. 17, 2016

(87) PCT Pub. No.: WO2015/159248
PCT Pub. Date: Oct. 22, 2015

(65) Prior Publication Data
US 2017/0182863 A1 Jun. 29, 2017

(30) Foreign Application Priority Data
Apr. 16, 2014 (IT) .............. TO2014A0322

(51) Int. Cl.
*B60H 1/00* (2006.01)
*B60H 3/06* (2006.01)

(52) U.S. Cl.
CPC ....... *B60H 1/00378* (2013.01); *B60H 3/0641* (2013.01); *B60H 2001/00085* (2013.01); *B60H 2001/00235* (2013.01)

(58) Field of Classification Search
CPC ... B60H 1/00; B60H 3/06; B60H 1/24; B62D 33/06; B60K 1/04
(Continued)

(56) References Cited

U.S. PATENT DOCUMENTS 3,626,713 A 12/1971 Venable
4,344,356 A * 8/1982 Casterton ........... B60H 1/00378
165/42

(Continued)

FOREIGN PATENT DOCUMENTS

DE 102009042269 A1 3/2011
EP 0513491 A1 11/1992
(Continued)

OTHER PUBLICATIONS

International Search Report in PCT/IB2015/052770 dated Apr. 16, 2014.
(Continued)

*Primary Examiner* — Steven B McAllister
*Assistant Examiner* — John E Bargero
(74) *Attorney, Agent, or Firm* — Henry J. Cittone; Cittone Demers & Arneri LLP

(57) ABSTRACT

Cabin air treatment apparatus for an agricultural machine, comprising at least an external air inlet (11, 16), a filtration system (20), an HVAC system (30), and a cabin air supply outlet (40). The apparatus further comprises a hermetically closed box (1) inside which the HVAC system (30) is housed, the box having a levelling opening (60) for placing the box (1) into communication with a cabin (C) of the agricultural machine to level a pressure inside the box (1) with a pressure inside the cabin (C),
wherein said at least one external air inlet comprises a first external air inlet (11) formed on the box (1). The filtration system comprises a first filter (21) for effecting a filtration of at least one among dust, aerosols and vapours, arranged at the first air inlet (11), and a blower (22) for drawing air from the first air inlet (11) and
(Continued)

delivering it to the HVAC system (30), said blower being arranged directly connected downstream of the first filter (21) and inside the box (1).

3 Claims, 6 Drawing Sheets

(58) Field of Classification Search
USPC .......................................... 454/139; 180/68.5
See application file for complete search history.

(56) References Cited

U.S. PATENT DOCUMENTS 5,492,505 A * 2/1996 Bell ...................... B60H 1/249
137/855
5,716,269 A * 2/1998 Garbooshian ...... B60H 1/00414
454/139
8,944,199 B2 * 2/2015 Fukunaga .............. B60K 11/06
180/68.5
2012/0125907 A1 5/2012 Chernyavsky

FOREIGN PATENT DOCUMENTS

EP 1503845 B1 2/2005
WO 2011004243 A1 1/2011

OTHER PUBLICATIONS

Written Opinion of the International Searching Authority in PCT/IB2015/052770 dated Apr. 16, 2014.

* cited by examiner

CABIN PRESSURIZATION SYSTEM FOR AGRICULTURAL MACHINES, HAVING A FILTRATION SYSTEM

CROSS-REFERENCE TO RELATED APPLICATIONS

This application is the U.S. national stage of PCT International Patent Application No. PCT/IB2015/052770, filed Apr. 16, 2015, which claims priority to Italian Patent Application No. TO2014A000322, filed Apr. 16, 2014, the disclosures of each of which are incorporated herein by reference in their entirety.

The present invention relates to a cabin air treatment apparatus for an agricultural machine, comprising at least an external air inlet, a filtration system connected downstream of the external air inlet, an HVAC system connected downstream of the filtration system, said HVAC system comprising at least one blower, and a cabin air supply outlet connected downstream of the HVAC system.

Conventional air treatment apparatus for agricultural machines provide dust filtration, but aerosols and vapours can, in practice, still flow freely into the vehicle cabin. As a general rule, these known apparatus are inflexible, and it is difficult to use them to achieve satisfactory levels of pressurization in the cab, in particular if the latest standards are borne in mind. There is also the problem of isolating the treatment apparatus to avoid penetration by contaminants, which requires accurate design of the sealing elements of the individual components of the apparatus.

The invention therefore proposes an apparatus of the type defined initially, further comprising a hermetically closed box inside which the HVAC system is housed, said box having a levelling opening for placing the box into communication with a cabin to level a pressure inside the box with a pressure inside the cabin,
wherein said at least one external air inlet comprises a first external air inlet formed on the box,
wherein the filtration system comprises:
 a first filter for effecting a filtration of at least one among dust, aerosols and vapours, positioned at the first air inlet, and
 a blower for drawing air from the first air inlet and delivering it to the HVAC system, said blower being arranged directly connected downstream of the first filter and inside the box, the blower of the filtration system being distinct from the blower of the HVAC system.

According to the invention, the HVAC system and the blower of the filtration system are therefore housed within a pressurized box, at the same pressure as that present within the cabin. The pressurization in the environment of the box surrounding the treatment apparatus prevents external contaminants from coming into contact with the various components of the HVAC system and with the blower. Consequently, it is unnecessary to have every individual component made so as to be protected from contaminant penetration; only the parts of the box communicating with the outside, particularly the air inlets with their filters, have to be configured for this purpose. This obviously provides a high degree of simplification as regards construction, resulting in cost savings, as well as greater safety in terms of operator protection.

Preferred embodiments of the invention are defined in the dependent claims, which are to be considered as an integral part of the present description.

Further characteristics and advantages of the apparatus according to the invention will be made clearer by the following detailed description of an embodiment of the invention, given with reference to the attached drawings which are provided purely as non-limiting illustrations, in which:

FIGS. 1 and 2a show a roof R of an agricultural machine, while the letter C indicates an area to be occupied by the cabin of the agricultural machine, under the roof R. According to the regulations on exposure to hazardous substances, the cabin is required to be isolated from the external environment (at least in the higher safety classes).

Figure 1:
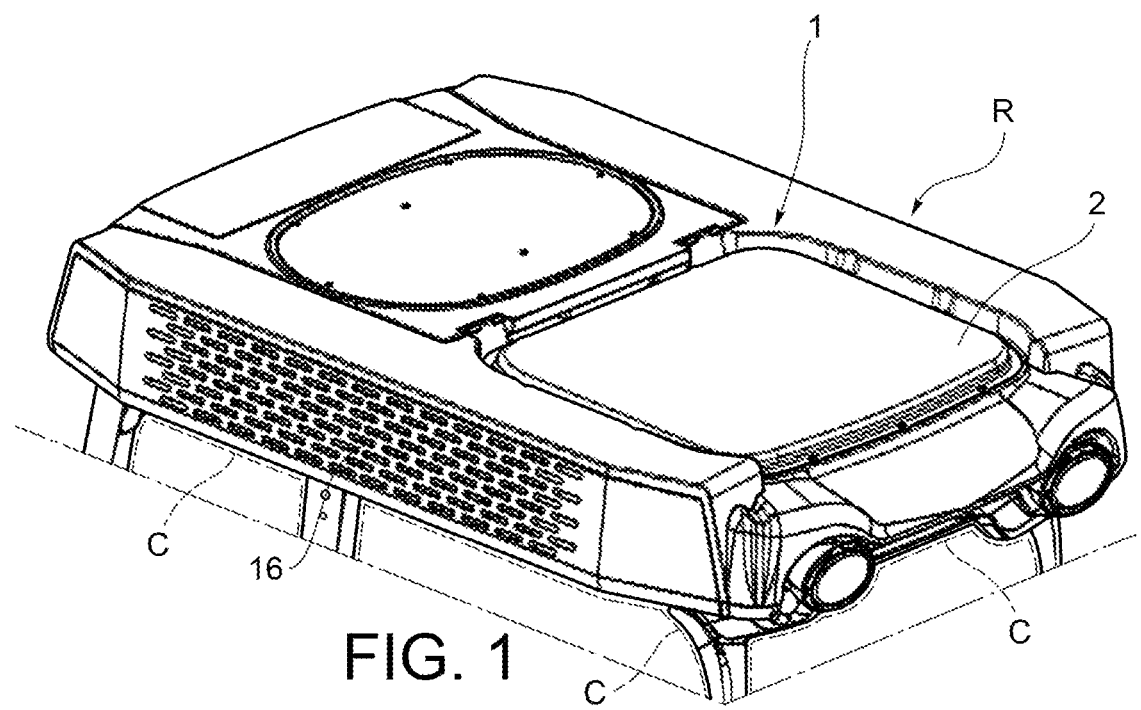
FIG. 1 is a perspective view of a roof of an agricultural machine provided with a treatment apparatus according to the invention.
Figure 2A:
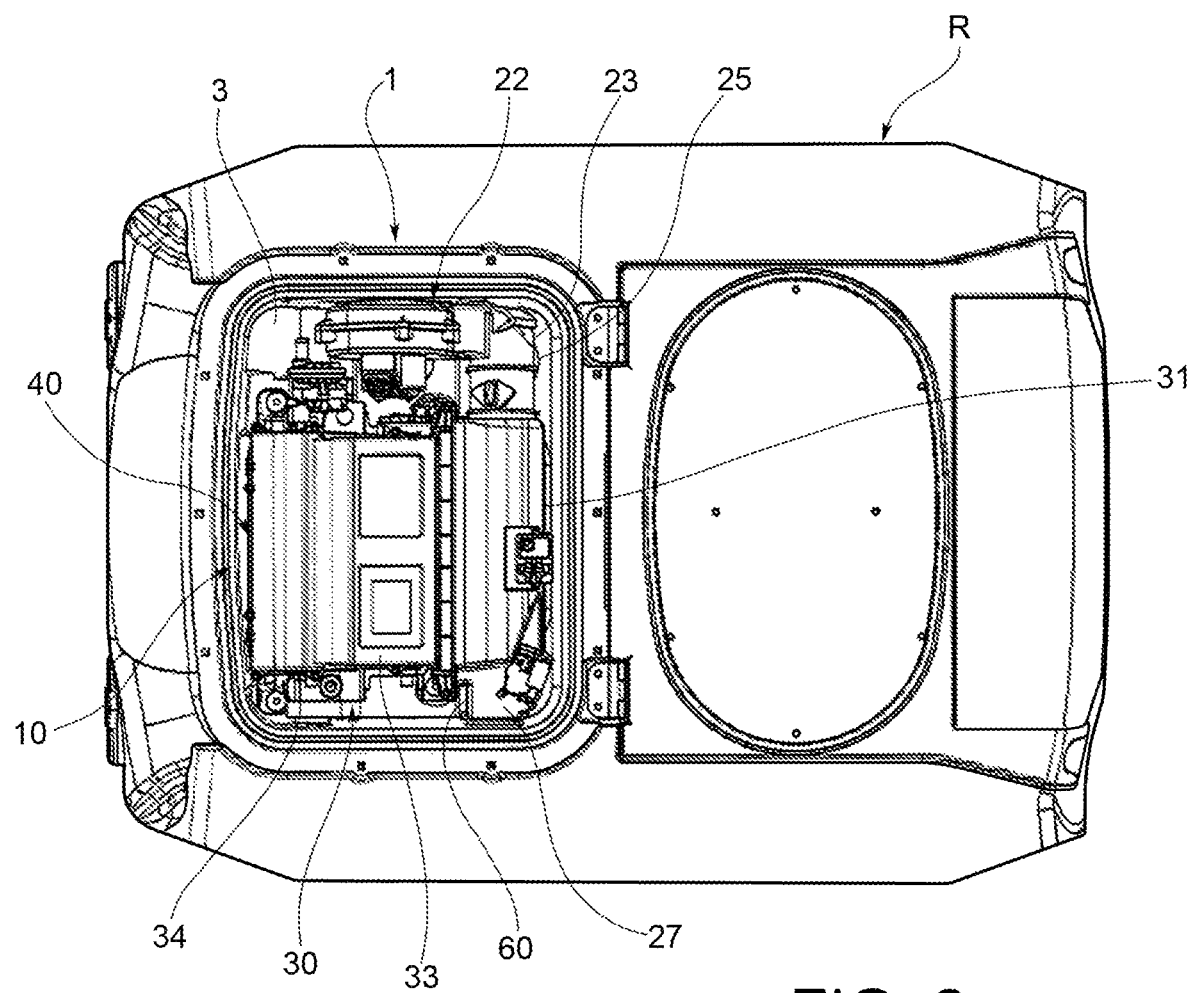
FIG. 2a is a plan view of the roof of FIG. 1, with the cover removed.
Figure 2B:
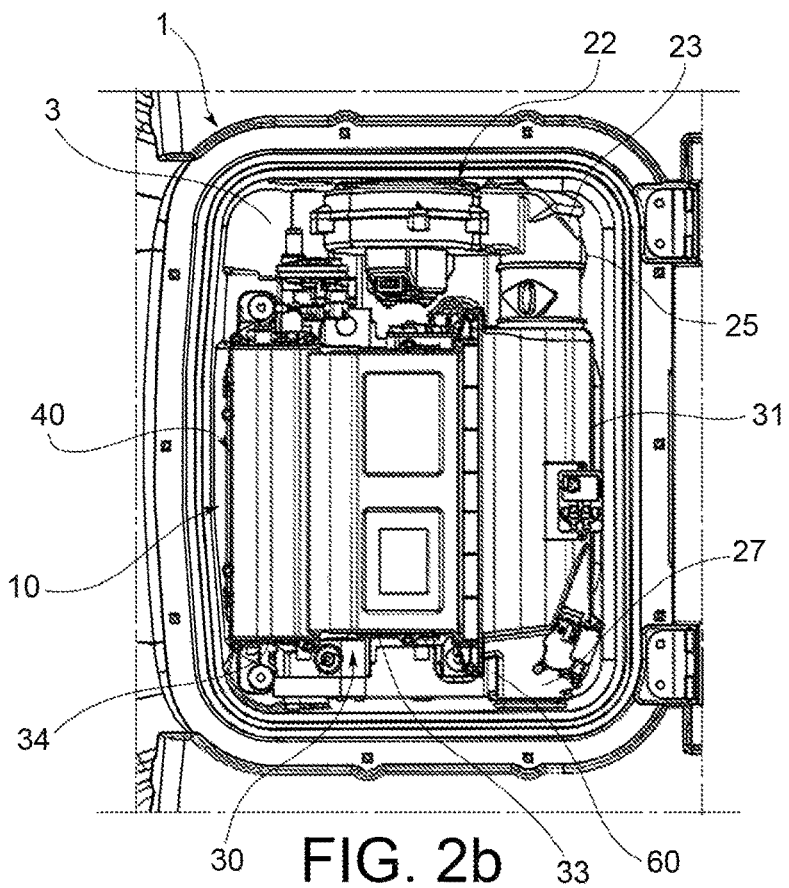
FIG. 2b is an enlarged plan view of a part of the roof with the cover removed.

A box 1, hermetically closed by a cover 2, is placed on the roof R of the agricultural machine. FIG. 2a shows the roof R with the box 1 from which the cover 2 has been removed; in particular, a gasket placed along a perimetric edge of the box is visible. As can also be seen in FIG. 2b, the box 1 forms a compartment 3, in which a part of an air treatment apparatus 10 according to the invention is placed.

The air treatment apparatus essentially comprises a first and a second external air inlet 11, 16, formed through the walls of the box 1, through which inlets air is drawn from the external environment, a filtration system 20 connected downstream of the external air inlets 11, 16, an HVAC system 30 connected downstream of the filtration system 20, and a cabin air supply outlet 40 connected downstream of the HVAC system 30 (visible in FIG. 3), through which treated air is supplied to the cabin C at a pressure greater than the pressure of the external environment.

Figure 4:
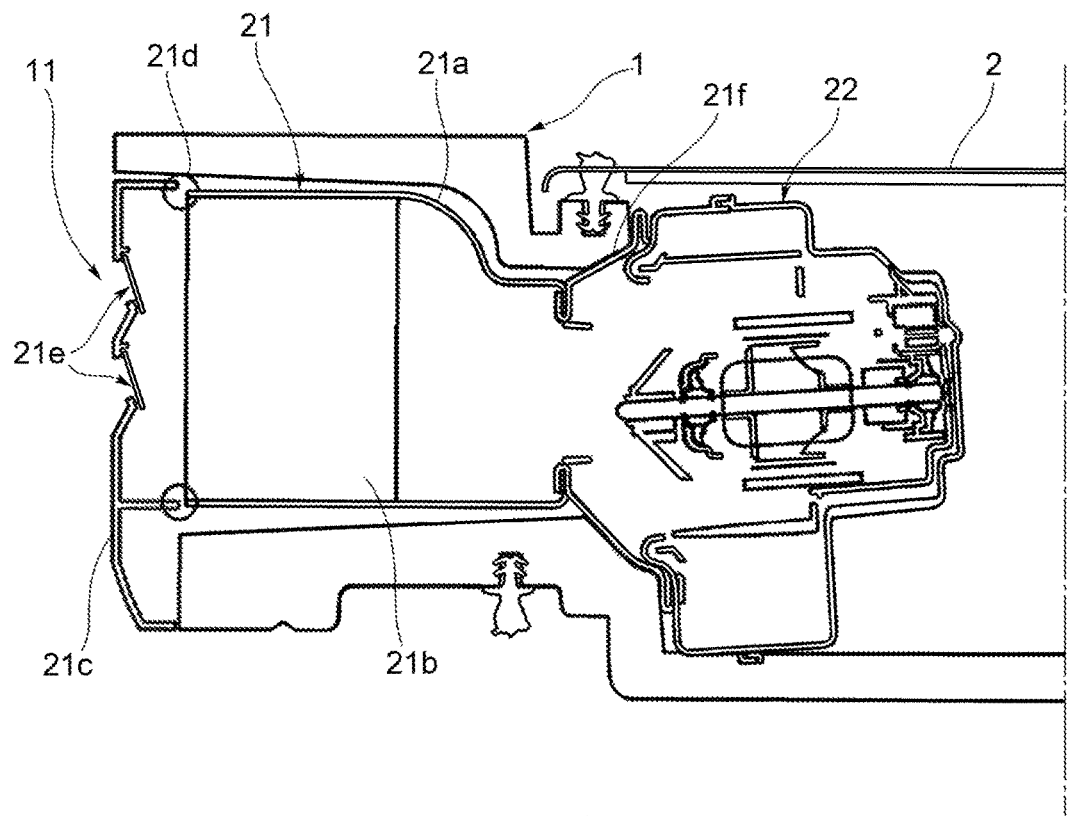
FIG. 4 is a sectional view of a first external air inlet of the treatment apparatus.
Figure 6:
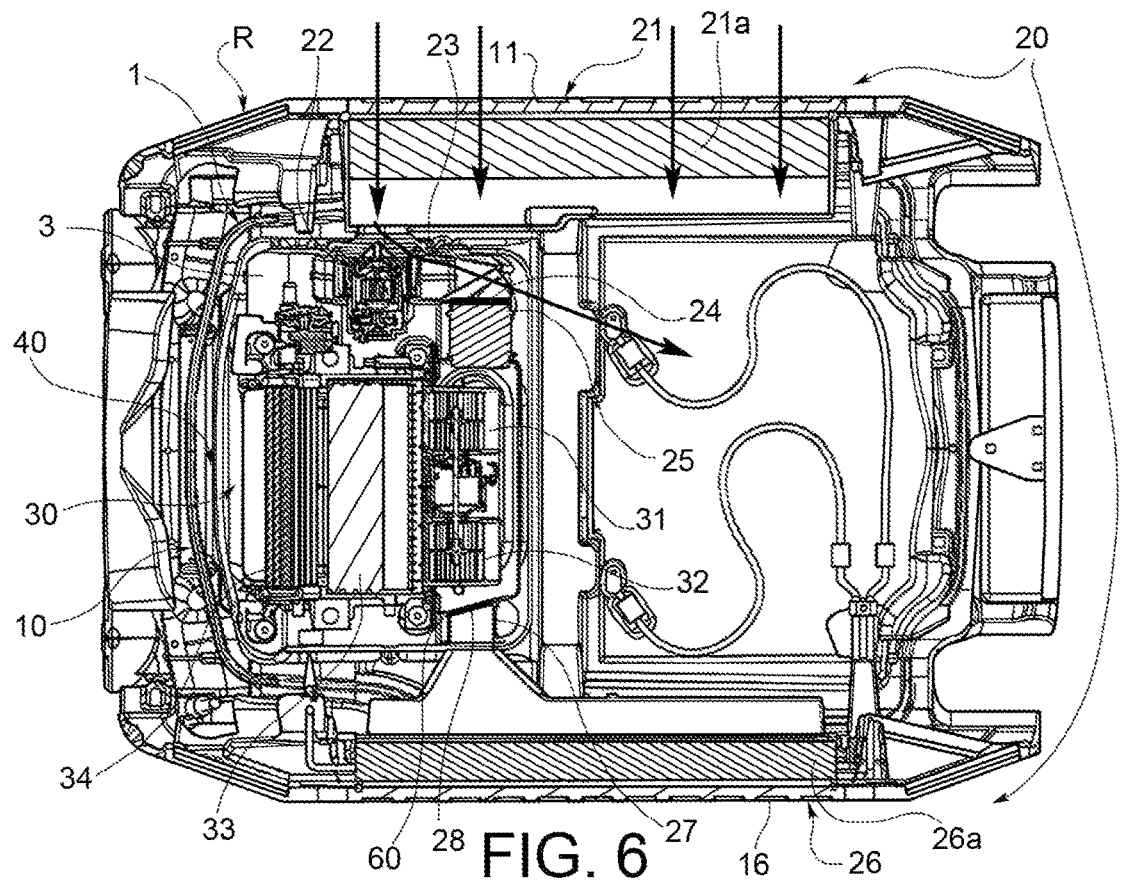
FIGS. 6 to 10 are sectional views of the roof, showing different operating configurations of the treatment apparatus.

With reference to FIGS. 4 and 6, the filtration system 20 comprises a first filter 21 for effecting a filtration of at least one among dust, aerosols and vapours, arranged at the first air inlet 11, and a blower 22 for drawing air from the first air inlet 11 and delivering it to the HVAC system 30, this blower being arranged directly connected downstream of the first filter 21 and inside the box 1.

An equivalent hole (not shown) is conventionally provided inside the cabin to adjust the pressurization of the environment inside the cabin.

With reference to FIG. 4, the first filter 21 comprises a filter box 21a and a filter body 21b housed inside the filter box 21a. Preferably, the filter body 21b is a filter chosen from among known filters capable of suppressing dust, aerosols and vapours, in other words a filter of category 4 according to European Standard EN 15695. An air inlet grille 21c is also mounted at the interface between the first air inlet 11 and the external environment, upstream of the filter body 21b. Sealing means 21d are interposed between the air inlet grille 21c and the air inlet of the filter box 21a. A shutter device 21e is placed at the air inlet grille 21c, this device being of the type biased towards a closed position and openable by a pressure downstream of the shutter device 21e lower than the pressure of the external environment. In the illustrated example, the shutter device 21e consists of a plurality of fins of elastic material, which bend towards the inside of the box 1, thereby opening the first air inlet 11, when the pressure downstream of the fins is lower than the pressure of the external environment.

The filter box 21a is fixed to the box 1, and its air outlet is connected to the blower 22, placed within the box 1, through sealing means 21f. In the illustrated example, the blower 22 is of the centrifugal type, and its outlet is connected, through a conduit 23, to the inlet of the HVAC system 30.

The conduit 23 is provided with an air distribution valve 24, shown schematically in FIGS. 6 to 10, whereby the first air inlet 11 is in selectively enabled or disabled communication with the HVAC system 30, as explained subsequently. The air inlet 11 is also connected through the conduit 23 and the distribution valve 24 to a purge conduit 25 connected to the outside and provided for the cleaning of the first filter 21, as explained subsequently.

Figure 5:
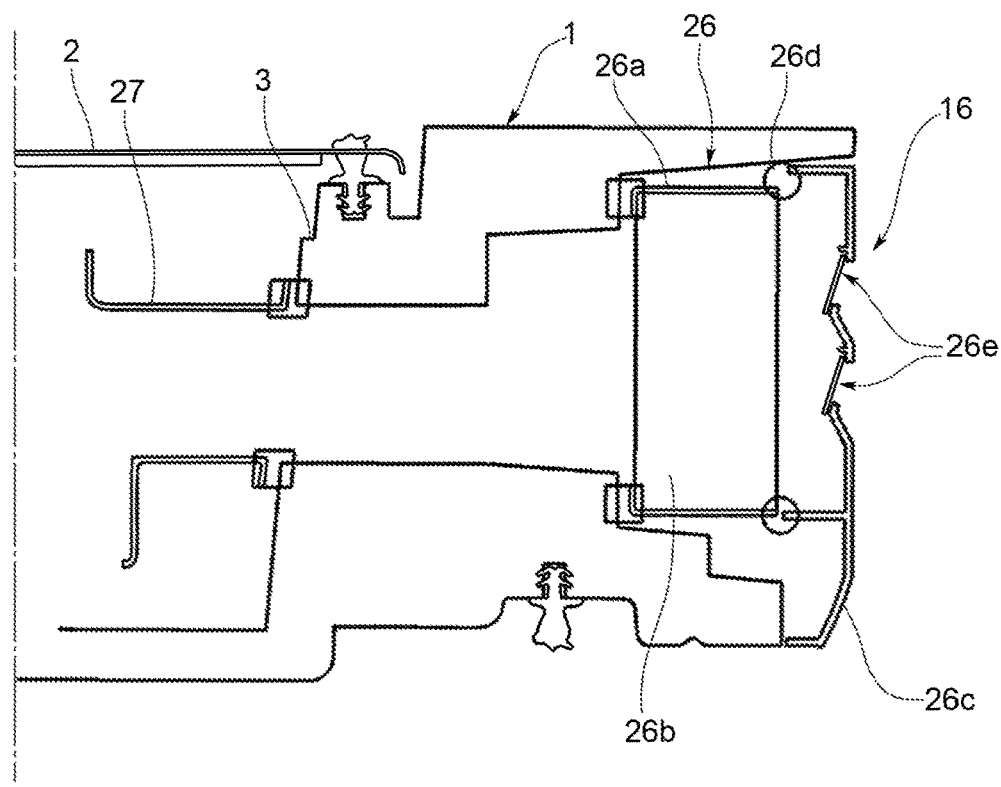
FIG. 5 is a sectional view of a second external air inlet of the treatment apparatus.

With reference to FIGS. 5 and 6, the filtration system 20 further comprises a second filter 26 for effecting a mechanical filtration of the dust, placed at the second air inlet 16.

With reference to FIG. 5, the second filter 26 comprises a filter box 26a and a filter body 26b housed inside the filter box 26a. Preferably, the filter body 26b is a filter of category 2 according to European Standard EN 15695, and is therefore of a lower category than the first filter 21. An air inlet grille 26c is also mounted at the interface between the second air inlet 16 and the external environment, upstream of the filter body 26b. Sealing means 26d are interposed between the air inlet grille 26c and the air inlet of the filter box 26a. A shutter device 26e is placed at the air inlet grille 26c, this device being of the type biased towards a closed position and openable by a pressure downstream of the shutter device 26e lower than the pressure of the external environment. In the illustrated example, the shutter device 26e consists of a plurality of fins of elastic material, which bend towards the inside of the box 1, thereby opening the second air inlet 16, when the pressure downstream of the fins is lower than the pressure of the external environment.

The filter box 26a is fixed to the box 1, and its air outlet is connected in a sealed way to a passage formed through a wall of the box 1, which, at its inner end, is connected in a sealed way via a conduit 27 to the inlet of the HVAC system 30.

The conduit 27 is provided with an air distribution valve 28, shown schematically in FIGS. 6 to 10, whereby the first air inlet 16 is in selectively enabled or disabled communication with the HVAC system 30, as explained subsequently. The external air inlet 16 is also connected through the conduit 27 and the air distribution valve 28 to the internal environment of the box 1 in order to keep the second filter 26 under pressure, as explained subsequently.

The HVAC system 30 is of a conventional type; fresh and recycled air to be supplied to the cabin C is dehumidified and brought to the desired temperature by means of this system. In a conventional way, the HVAC system 30 may comprise an air mixing plenum 31, one or more blowers 32 (visible in FIGS. 6 to 10), an evaporator 33, and a heater 34.

Figure 3:
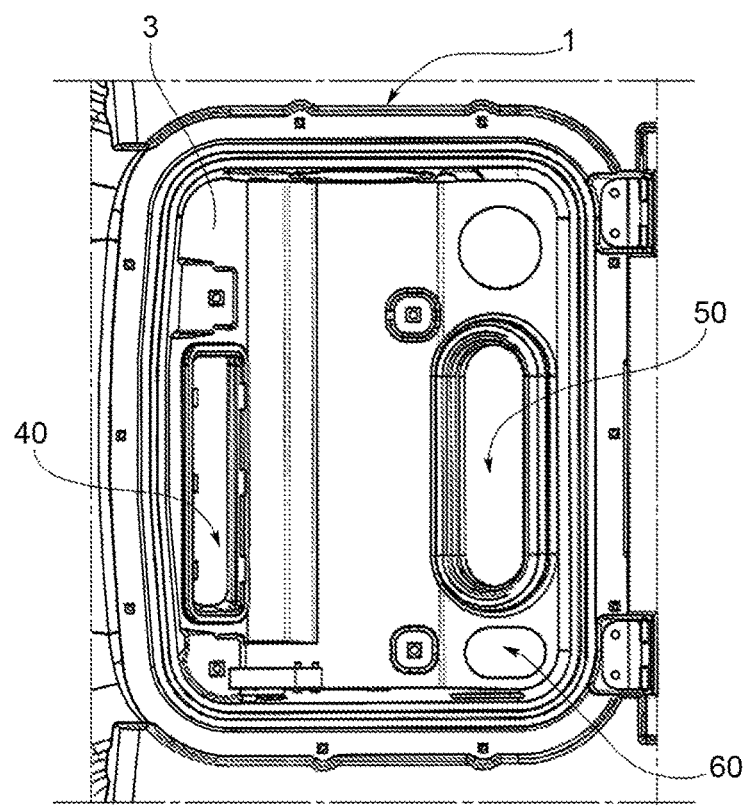
FIG. 3 is a plan view of the part shown in FIG. 2, with the treatment apparatus also removed.

The cabin C is also connected to the air mixing plenum 31 of the HVAC system 30 through an air recycling opening 50 formed on the box 1, visible in FIG. 3.

The box 1 also has a levelling opening 60, visible in FIG. 3, for placing the internal space 3 of the box 1 into communication with the cabin C to level the pressure inside the box 1 with the pressure inside the cabin C.

The operation of the individual components of the apparatus according to the invention and the monitoring of the pressure and HVAC conditions within the cabin C are controlled by an electronic control unit (not shown).

With reference to FIGS. 6 to 10, different operating configurations of the air treatment apparatus according to the invention will now be illustrated.

FIG. 6 shows a cleaning configuration, which may be adopted when the apparatus is started up. In this configuration, the distribution valve 24 associated with the conduit 23 connecting the first external air inlet 11 to the HVAC system 30 is positioned so as to disable the communication between the first external air inlet 11 and the HVAC system 30, and to enable the communication between the first external air inlet 11 and the purge conduit 25. The distribution valve 28 associated with the conduit 27 connecting the second external air inlet 16 to the HVAC system 30 is positioned so as to disable the communication between the second external air inlet 16 and the HVAC system 30. The unnumbered arrows depicted in FIG. 6 represent the air path created by this configuration. The air entering from the air inlet 11, having been drawn in by the blower 22, is used to remove any deposits within the first filter 21 and to discharge them to the outside through the purge conduit 25.

Figure 7:
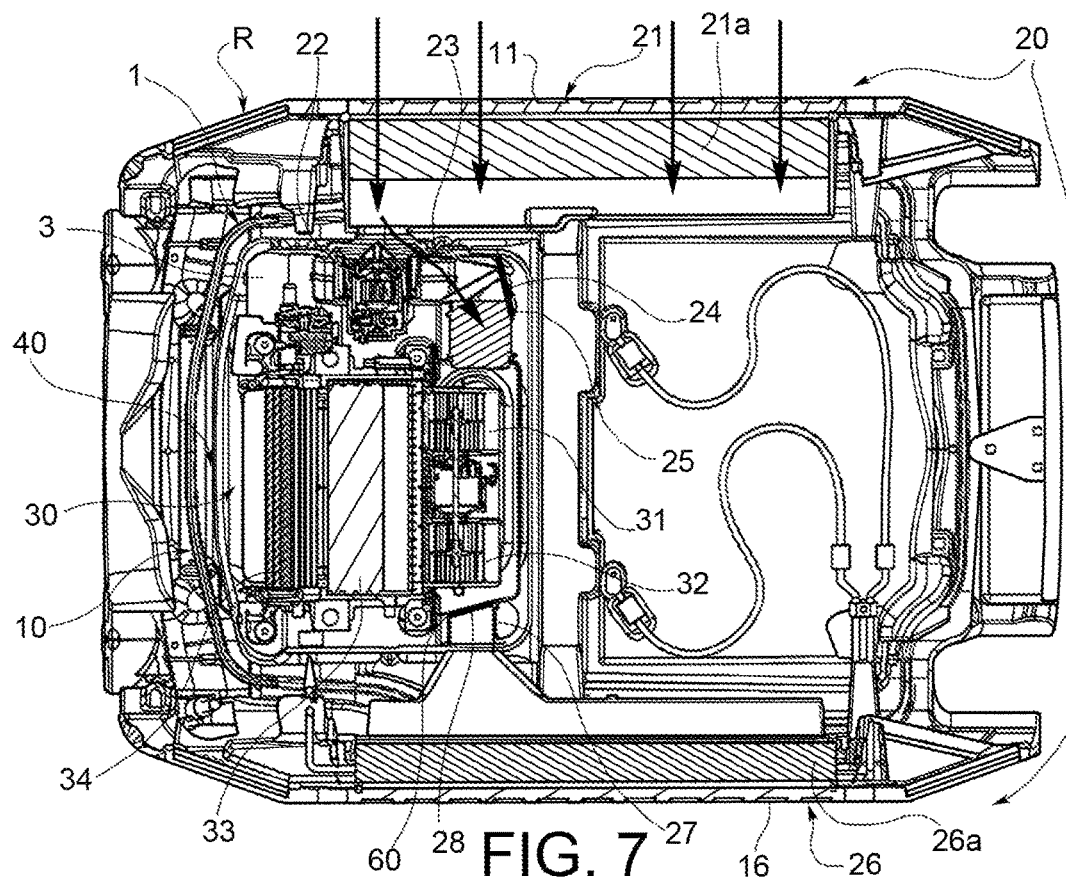

FIG. 7 shows a configuration of initial pressurization of the apparatus. In this configuration, the distribution valve 24 associated with the conduit 23 connecting the first external air inlet 11 to the HVAC system 30 is positioned so as to enable the communication between the first external air inlet 11 and the HVAC system 30, and to disable the communication between the first external air inlet 11 and the purge conduit 25. The distribution valve 28 associated with the conduit 27 connecting the second external air inlet 16 to the HVAC system 30 remains in the position which prevents communication between the second external air inlet 16 and the HVAC system 30. The unnumbered arrows depicted in FIG. 7 represent the air path created by this configuration. The air entering from the air inlet 11, having been drawn in by the blower 22, passes through the first filter 21 and the HVAC system 30, and then through the cabin air supply outlet 40 to pressurize the cabin C.

Figure 8:
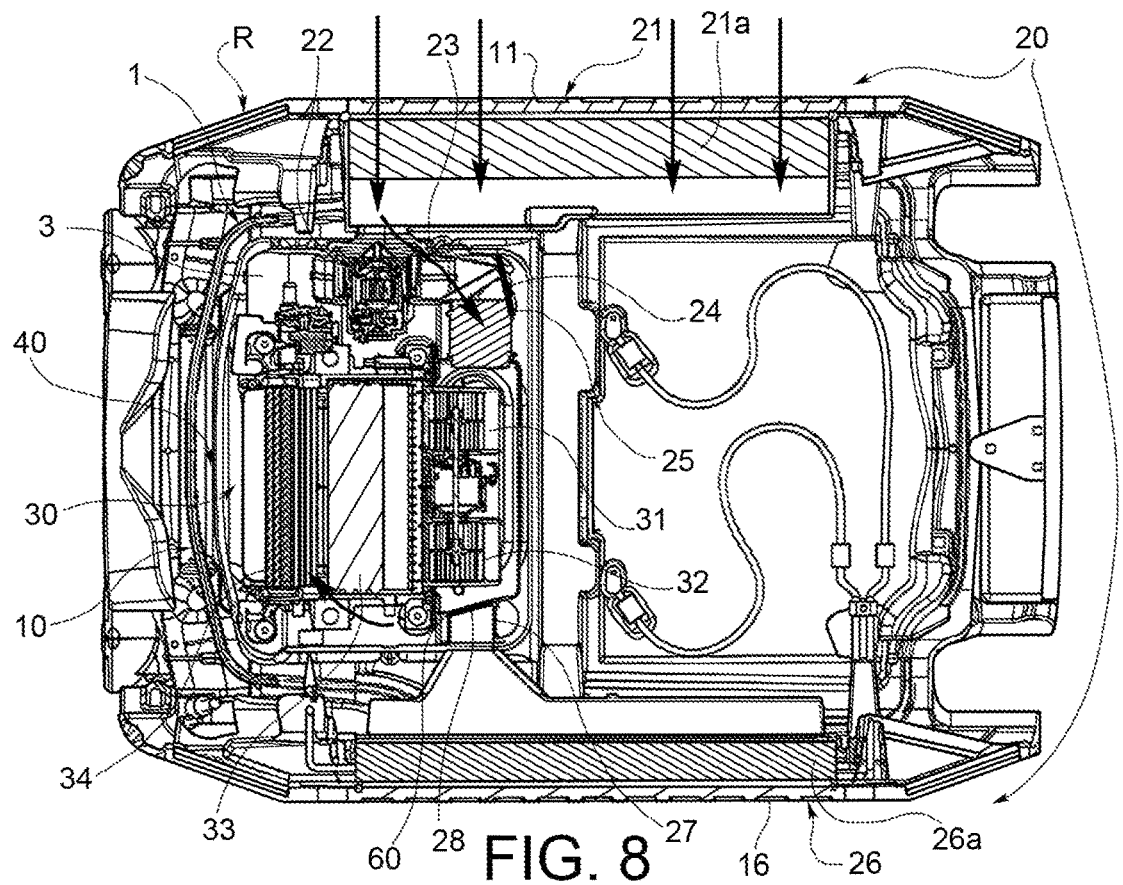

FIG. 8 shows a configuration of steady-state pressurization of the apparatus. In this condition, the distribution valve 24 associated with the conduit 23 connecting the first external air inlet 11 to the HVAC system 30 remains in the position which allows communication between the first external air inlet 16 and the HVAC system 30, and the distribution valve 28 associated with the conduit 27 connecting the second external air inlet 16 to the HVAC system 30 remains in the position which prevents communication between the second external air inlet 16 and the HVAC system 30. This position of the distribution valve 28 also allows communication between the second external air inlet 16 and the internal space 3 of the box 1. The unnumbered arrows depicted in FIG. 8 represent the path of the air. The air which continues to enter the cabin C along the path indicated above with reference to FIG. 7 also passes from the cabin C into the space 3 within the box 1, through the levelling opening 60, so that it also pressurizes the interior of the box 1, and passes from the space 3 into the conduit 27 in communication with the space 3, so that it also pressurizes the second filter 26.

Figure 9:
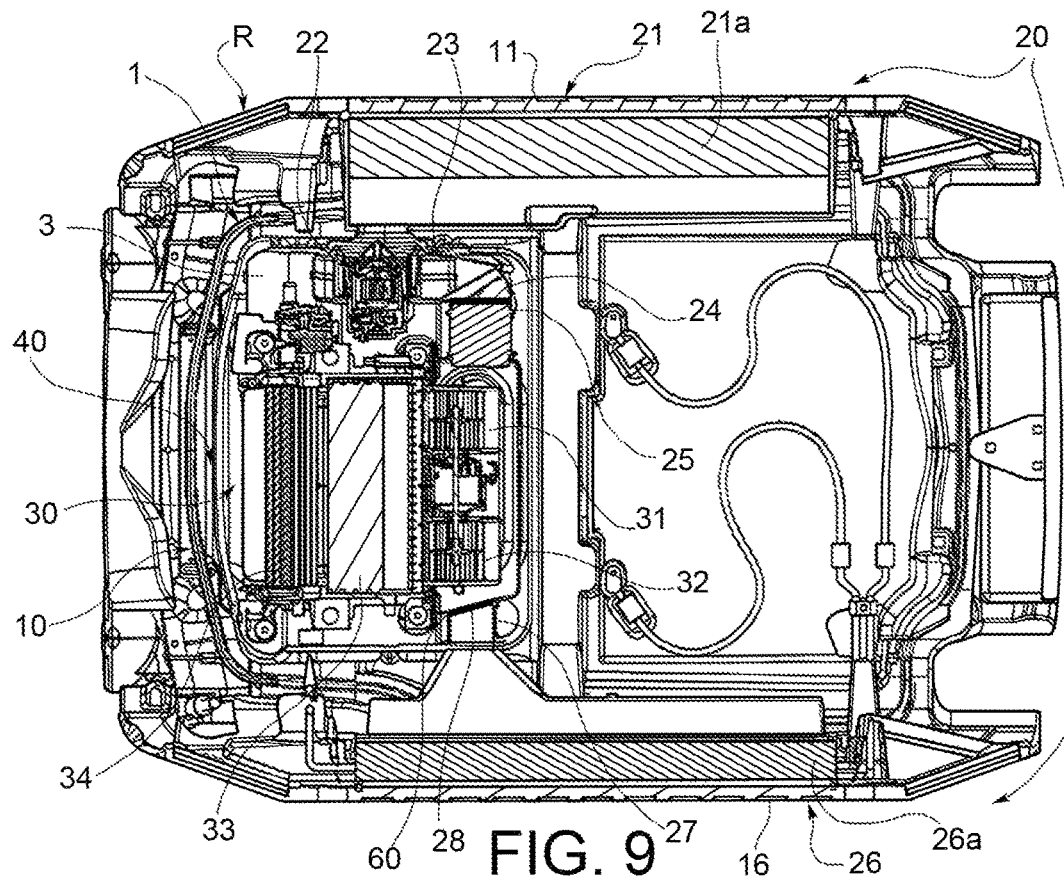

FIG. 9 shows a configuration of anomaly detection in the apparatus. In this condition, the distribution valve 24 associated with the conduit 23 connecting the first external air inlet 11 to the HVAC system 30 is positioned so as to disable the communication between the first external air inlet 11 and the HVAC system 30, and the distribution valve 28 associated with the conduit 27 connecting the second external air inlet 16 to the HVAC system 30 is positioned so as to disable the communication between the second external air inlet 16 and the HVAC system 30. In this way, external air is prevented from entering the cabin C through the two external air inlets 11, 16.

Figure 10:
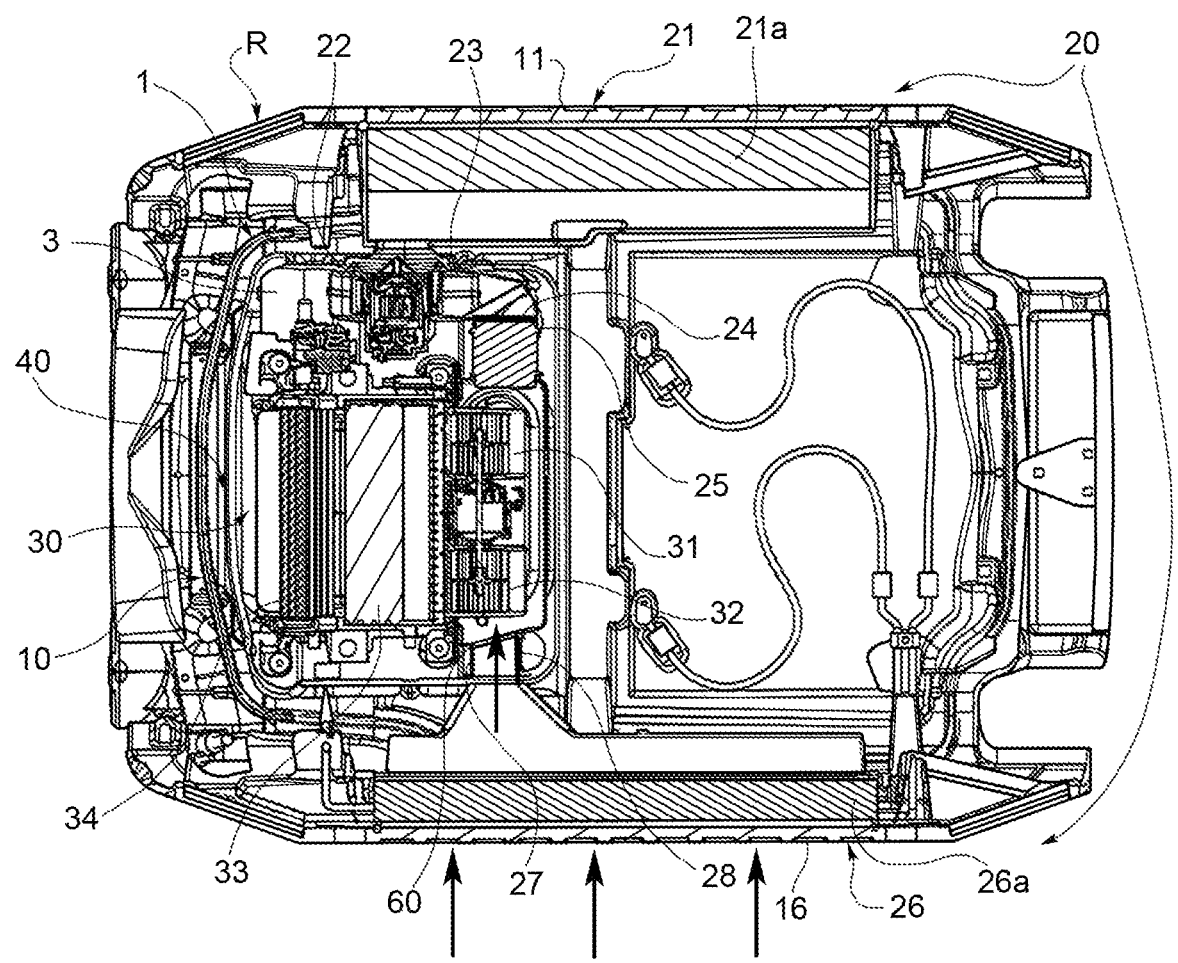

FIG. 10 shows an operating configuration with the lower category filter associated with the second external air inlet. This configuration may be used as an alternative to the higher category operating configuration (shown in the preceding figures) when the operating conditions do not require a high degree of protection against contaminants. In this configuration, the distribution valve 24 associated with the conduit 23 connecting the first external air inlet 11 to the HVAC system 30 is positioned so as to disable the communication between the first external air inlet 11 and the HVAC system 30, and the distribution valve 28 associated with the conduit 27 connecting the second external air inlet 16 to the HVAC system 30 is positioned so as to enable the communication between the second external air inlet 16 and the HVAC system 30. The unnumbered arrows depicted in FIG. 10 represent the air path created by this configuration. The air entering from the air inlet 16, having been drawn in by the blower 32 of the HVAC system, passes through the second filter 26 and the HVAC system 30, and then through the cabin air supply outlet 40 to pressurize the cabin C. The air which continues to enter the cabin C also passes from the cabin C into the space 3 within the box 1, through the levelling opening 60, so that it also pressurizes the interior of the box 1.

The invention claimed is:

1. Cabin air treatment apparatus for an agricultural machine, comprising at least one external air inlet, a filtration system connected downstream of the external air inlet, an HVAC system connected downstream of the filtration system, said HVAC system comprising an HVAC blower, and a cabin air supply outlet connected downstream of the HVAC system, wherein the cabin air treatment apparatus further comprises a box inside which the HVAC system is housed, said box having a levelling opening for placing the box into communication with a cabin of the agricultural machine to level a pressure inside the box with a pressure inside the cabin, wherein said at least one external air inlet comprises a first external air inlet and a second external air inlet both formed on the box, said first external air inlet and second external air inlet being in selectively enabled or disabled communication with the HVAC system, and wherein the filtration system comprises:
 a first filter for effecting a filtration of dust, aerosols and vapours, arranged at the first air inlet,
 a filter blower for drawing air from the first external air inlet and delivering it to the HVAC system, said filter blower being arranged directly connected downstream of the first filter and inside the box, the filter blower being distinct from the HVAC blower, and
 a second filter for effecting a mechanical filtration of dust, arranged at the second external air inlet, wherein the filter blower is not arranged downstream of the second filter, air being drawn through the second external air inlet and second filter by the HVAC blower.

2. Apparatus according to claim 1, wherein when the first external air inlet is in a condition of enabled communication with the HVAC system and the second external air inlet is in a condition of disabled communication with the HVAC system, the second filter is placed into communication with the inside of the box to level a pressure at the second filter with the pressure inside the box.

3. Apparatus according to claim 1, wherein said box is adapted to be arranged at a roof of an agricultural machine, above said cabin.

* * * * *